July 27, 1971     C. H. MILLER     3,595,642
PORTLAND CEMENT WITH IMPARTED REFRACTORY CHARACTER
Filed Sept. 24, 1968
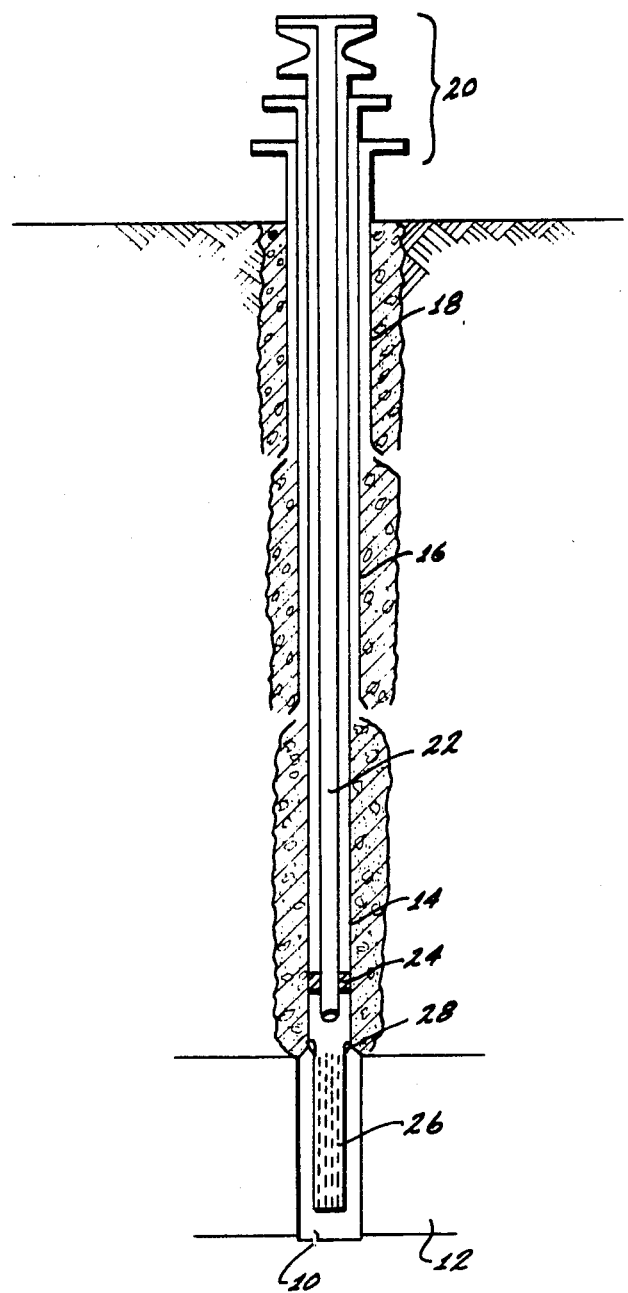
INVENTOR
CHARLES H. MILLER
BY Nilsson & Robbins
ATTORNEYS United States Patent Office 3,595,642
Patented July 27, 1971

3,595,642
PORTLAND CEMENT WITH IMPARTED
REFRACTORY CHARACTER
Charles H. Miller, Balboa, Calif., assignor to
Motus Chemicals, Inc.
Filed Sept. 24, 1968, Ser. No. 761,991
Int. Cl. E21b 33/13; C04b 13/02
U.S. Cl. 166—292                                            4 Claims

ABSTRACT OF THE DISCLOSURE

A refractory cement in which an aluminum silicate, having from about 15 to about 27 weight percent of an aluminum oxide content, is combined with an hydraulic cement to impart resistance thereto to high temperature changes. The refractory cement is particularly useful in cementing oil well casings.

BACKGROUND OF THE INVENTION

(1) Field of the invention

The fields of art to which the invention pertains include the fields of refractory coating compositions and well cementing.

(2) Description of the prior art

In drilling a well, lengths of steel tube are placed in the well bore, threaded and coupled to form a continuous string therein. A plurality of such strings, one within the other, may be utilized, but each string must be cemented to the walls of the bore through which it exendts. Generally, ordinary Portland cement is used in cementing casing, although special retarders are often added to prevent too rapid setting under the high heat and pressure encountered at great depths. The cement is pumped down into the casing and displaced with fluid to flow outside and upwardly to a predetermined height to occupy the space between the walls of the well bore and casing.

The portland or other hydraulic cement is mixed with sand, gravel and/or other aggregate, prior to being mixed with water. A problem encountered when utilizing the common aggregates is that they consist of, or contain large quantities of silica which undergoes a crystalline inversion when raised to high temperatures. At temperatures over 573° C., the silicon and oxygen atoms rearrange themselves into a crystalline form known as high quartz, the ordinary low temperature form being known as low quartz. When the temperature is lowered, the atoms again rearrange their positions to the low quartz form. Such changes occur in most forms of silica and aggregates such as quartz, chalcedony and its subvarieties such as chert and jasper, tridymite and cristobalite undergo volume changes at elevated temperatures that tears at the bond between aggregate and cement causing destruction of the monolithic mass.

SUMMARY OF THE INVENTION

The present invention provides a cement mixture that can withstand the high temperatures encountered in oil wells and the like without significant breakdown or deterioration. Refractory cement mixtures are provided utilizing hydraulic cement and an aggregate of aluminum silicate. Although silicates are actually added to the cement, the aluminum silicate utilized herein is such that the resultant concrete, at least within the compositions provided by this invention, does not undergo silica inversion to any significant extent. Such aluminum silicates are unusually water soluble, particularly in alkaline water, and apparently chemically unite with the cement components to form, during setting, what appear to be garnet-like crystals which impart improved hardness to the concrete. The resultant concrete is also found to have improved heat insulation. The foregoing properties are obtained within the time limits of oil well cementing practice making the cement mixtures desirable for use in such wells and also in secondary steam recovery, fire flooding, geophysical steam recovery and naturally hot wells.

Specifically, the refractory cement mixture comprises, by weight, one part of an hydraulic cement and about $\frac{1}{200}$ part to about 9 parts of an aluminum silicate, the aluminum silicate having from about 15 to about 27 weight percent of an aluminum oxide content. In particular embodiments, the amount of aluminum silicate having a fineness of —325 mesh pan fines or finer is no more than about 20 percent by weight of the cement mixture. In other embodiments, particularly where the cement is poured into a region of high ambient temperature, such as found in deep oil wells, a retarder can be added to prevent rapid setting of the cement.

BRIEF DESCRIPTION OF THE DRAWING

The figure is a schematic, cross-sectional view of oil well casing strings secured by cement to the wall of a well bore.

DESCRIPTION OF THE PREFERRED EMBODIMENTS

Referring to the drawing, a schematic oil well is shown in section having a well bore 10 extending into an oil reservoir 12. A number of strings of casing 14, 16 and 18 are set into the well bore and terminate exteriorly thereof in a well head assembly 20. Piping 22, for conducting the well effluent to the surface, is provided within the inner casing and supported therein by a production packer 24. A preperforated liner 26 is suspended from the lowermost casing 14 by a liner hanger 28 set therein.

In order to obtain the benefits of the casing, it is important to securely seal each string of casing to the walls of the hole for at least some distance up from the bottom thereof. After each casing string is in place, cement is pumped down the inside and up the outside to a predetermined height, occupying the space between the casing and the walls of the well bore to effect the desired seal. As exemplary with this invention, one utilizes as the cement a mixture of 1 part by weight of ordinary portland cement and 3 parts by weight of aluminum silicate sold under the trade name "Franconia" by the Franconia Mining Corporation, Oklahoma City, Okla. The mixture is obtained by blending the materials together in a suitable container and tumbling until thoroughly mixed. Thirty-five parts by weight of water are then added to make the slurry that will be pumped into the well. The resultant cement sets to form a casing seal of superior strength and insulation. A cement density of about 90 pounds per cubic foot is obtained having a compressive ultimate strength of from about 3,000 to about 3,300 pounds per square inch. In comparison, ordinary portland cement of the same density has a compressive ultimate strength of about 1,500 pounds per square inch.

The cement formations of this invention also have superior insulating properties. The K factor of a cement formation is indicative of the amount of heat that can be transmitted under vacuum through one inch thereof. In tests conducted comparing the K factors for formal portland cement with the "Franconia" modified cement illustrated above, it was found at ordinary temperatures that normal portland cement had a K factor of about 1.5 whereas the improved cement of this invention had a K factor of only 0.4 at 2000° F., normal portland cement was found to have a K factor of about 6 whereas the improved cement of this invention had a K factor of only 2.5.

The cement compositions of this invention may be prepared, in general, by incorporating the aluminum silicate in a uniformly distributed manner, in normal portland cement or the equivalent. This may be effected by addition of the materials, either previously mixed together or separately, to the finished cement and intergrinding or otherwise thoroughly mixing the same, or by addition of the aluminum silicate to the cement clinker and then grinding the mixture to the desired fineness. Normal portland cement, i.e., A.S.T.M. type I, is particularly suitable for use herein, but the other types, II–V, can also be improved by this invention.

When the cement is going to be utilized under conditions of high temperature, flash setting can be inhibited by the incorporation of any of a variety or retarders, as known to the art. Such retarders include gypsum and other calcium sulfates; salts of lead; copper and zinc; organic retarding agents such as carbohydrates or lignosulphonates; low concentrations of calcium chloride or calcium nitrate; salts of carboxymethylcellulose, such as sodium carboxymethylcellulose; and the like. Small amounts only are needed, such as 0.05–0.3 weight percent. For example, 0.1 weight percent of sodium carboxymethylcellulose can be added to the cement mixture described above to impart set retardant properties thereto.

In place of the "Franconia," one can use other, similar mineral deposits, or artifical equivalent chemical compositions. The "Franconia" is a naturally expanded koalin-type material, much lighter than kaolin itself and containing a much smaller percentage of aluminum oxide. Chemically, aluminum silicates having from about 15 to about 27 weight percent of aluminum oxide content are suitable. Aluminum silicates having aluminum oxide contents greater than about 27 percent do not appreciably add to the beneficial properties of the final composition but drastically increase the cost thereof. With aluminum oxide contents of less than about 15 percent it is found that silica inversion sets in during a temperature rise. In addition to aluminum oxide and silicon dioxide, sodium and/or potassium, or the like, alkalinity can be present to the extent of about 8 weight percent total alkali metal oxide. Additionnally, up to about 2 weight percent contaminants can generally be tolerated. The following compositional range, in weight percent, is representative of the invention:

| | |
|---|---|
| Silicon dioxide ($SiO_2$) | 60–80 |
| Aluminum oxide ($Al_2O_3$) | 15–27 |
| Crystalline water ($H_2O$) | 5–15 |
| Total alkali oxides | 0–8 |

The "Franconia" aluminum silicate utilized in the foregoing example has the following composition, in weight percent:

| | |
|---|---|
| Silicon dioxide ($SiO_2$) | 73.2 |
| Aluminum oxide ($Al_2O_3$) | 18.5 |
| Crystalline water ($H_2O$) | 7.9 |
| Potassium oxide ($K_2O$) | 0.2 |
| Impurities | 0.2 |

In place of the "Franconia," one can utilize "Motus Mineral," sold by the Motus Chemical Corporation, Las Vegas, Nev., which has a composition falling within the foregoing range. Similar mineral deposits can be found in various high desert regions in midwest Arizona.

Even a small amount of aluminum silicate, as described, imparts desirable properties to the hydraulic cement and as small amounts as 1/200 part per part of hydraulic cement can be utilized with significant results. Generally, up to about 9 parts of aluminum silicate to 1 part of hydraulic cement is a practical upper limit. Near such upper limit, the resultant formation is a refactory, highly insulating fire brick. When utilizing very small amounts of the aluminum silicate, it is desirable to utilize very finely ground aluminum silicate to better effect dispersion thereof. On the other hand, with larger concentrations of aluminum silicate, coarser forms generally yield cement formations of higher strength. Thus, with the foregoing 3:1 mixture of aluminum silicate and hydraulic cement, an aluminum silicate having about 10 weight percent pan fines of −325 mesh gives satisfactory results. In general, the amount of aluminum silicate having a fineness of −325 mesh pan fines or finer should be no more than about 20 percent by weight of the total cement-aluminum silicate.

What is claimed is:
1. A method for cementing an oil well casing, comprising:
    placing a casing in a well;
    pumping into said well whereby to occupy the space between the casing and wall of said well, a water slurry of cement, said cement, exclusive of said slurry water, consisting essentially of portland cement and, as aggregate, an alkaline water soluble aluminum silicate sufficient to decrease the K factor and increase the strength of said cement while retaining refractory character of said cement, said aluminum silicate having the following composition, in weight percent:

| | |
|---|---|
| Silicon dioxide ($SiO_2$) | 60–80 |
| Aluminum oxide ($Al_2O_3$) | 15–27 |
| Crystalline water ($H_2O$) | 5–15 |
| Total sodium and potassium oxides ($Na_2O+K_2O$) | 0–8 |
| Contaminants | 0–2 | and allowing said cement slurry to set whereby to seal the casing to said well wall.

2. The invention according to claim 1 wherein the cement contains a retarder to prevent rapid setting thereof.

3. The invention according to claim 1 in which the amount of said aluminum silicate having a fineness of −325 mesh pan fines or finer is no more than about 20 percent by weight of said mixture.

4. The invention according to claim 1 wherein said aluminum silicate has approximately the following composition, in weight percent:

| | |
|---|---|
| Silicon dioxide ($SiO_2$) | 73.2 |
| Aluminum oxide ($Al_2O_3$) | 18.5 |
| Crystalline water ($H_2O$) | 7.9 |
| Potassium oxide ($K_2O$) | 0.2 |
| Impurities | 0.2 |

References Cited
UNITED STATES PATENTS

| | | | |
|---|---|---|---|
| 3,467,535 | 9/1969 | Myles | 106—104 |
| 3,180,748 | 4/1965 | Holmgren et al. | 106—104 |
| 2,888,406 | 5/1959 | Bondley et al. | 106—104 |
| 2,868,295 | 1/1959 | Brooks et al. | 106—89 |
| 2,776,010 | 1/1957 | Rike | 106—89 |

OTHER REFERENCES

Lea & Desch, "The Chemistry of Cement and Concrete," Edw. Arnold & Sons, pp. 55–56 (1956).

Barry & Mason, "Mineralogy," W. H. Freeman & Sons, pp. 550–553 (1959).

Ries: "Clays," John Wiley & Sons, pp. 320 and 369 (1927).

TOBIAS E. LEVOW, Primary Examiner

W. T. SCOTT, Assistant Examiner

U.S. Cl. X.R.

106—65, 89, 97, 104, 315